United States Patent [19]

Bulanchuk

[11] 4,022,967
[45] May 10, 1977

[54] CLAMPING HOLDER FOR BUSBARS

[75] Inventor: William J. Bulanchuk, Pelham, N.Y.

[73] Assignee: Midland-Ross Corporation, Cleveland, Ohio

[22] Filed: Nov. 28, 1975

[21] Appl. No.: 635,943

[52] U.S. Cl. .............................. 174/156; 24/136 R; 174/158 R; 191/23 A; 191/40; 248/63; 248/68 R

[51] Int. Cl.² .................. H01B 17/06; B60M 1/16; F16L 3/02; F16L 3/10

[58] Field of Search ............ 174/40 R, 99 B, 99 E, 174/149 B, 155, 156, 157, 160, 168, 171, 174, 175; 24/73 SA, 73 AP, 136 R, 136 B, 263 C, 263 SW; 191/23 A, 32, 40, 45 A; 339/22 B, 22 T; 248/58, 61, 62, 63, 67.5, 68 R, 68 CB, 74 R

[56] References Cited

UNITED STATES PATENTS

| | | | |
|---|---|---|---|
| 2,006,931 | 7/1935 | Powers | 174/155 |
| 3,085,775 | 4/1963 | Crates et al. | 191/40 X |
| 3,436,043 | 4/1969 | Hollander | 248/63 |

FOREIGN PATENTS OR APPLICATIONS

| | | | |
|---|---|---|---|
| 550,035 | 12/1922 | France | 174/155 |

*Primary Examiner*—Laramie E. Askin
*Attorney, Agent, or Firm*—H. Duane Switzer

[57] ABSTRACT

A clamping holder for busbars includes a base member having at least one projection, opening and clamping surface all located and shaped for reversible positioning of a pair of the base members with the projection on each received in the opening in the other, and with the clamping surfaces in spaced-apart facing relationship to define a part receiving aperture in which a busbar or other part is clamped and held.

8 Claims, 9 Drawing Figures

CLAMPING HOLDER FOR BUSBARS

BACKGROUND OF THE INVENTION

This application relates to the art of clamping and holding devices for clamping and holding parts and, more particularly, to such clamping and holding devices formed in two cooperating parts which clamp and hold parts without requiring additional fasteners. The invention is particularly applicable for use as insulators for suspending and spacing electrical busbars, and will be particularly described with reference thereto. However, it will be appreciated that the invention has broader aspects, and may be used for clamping and holding parts other than electrical busbars.

One type of electrical distribution system includes an elongated hollow metal housing in which a plurality of spaced-apart busbars are supported. A trolley having brushes runs along the housing with its brushes engaging the busbars. The busbars have commonly been suspended within the metal housing by hangers made of insulating material and having openings through which the busbars pass. These hangers are conventionally of one-piece construction and the busbars are free to move longitudinally relative to the hangers. In order to prevent longitudinal movement of the hangers, it is necessary to provide special spring clips or other fasteners on at least the terminal hangers for each housing section.

It would be desirable to have a hanger for busbars which would securely clamp and hold the busbars without requiring the use of additional springs or other fasteners.

SUMMARY OF THE INVENTION

A clamping holder includes a base member having at least one projection, opening and clamping surface all positioned for cooperation with a reversely positioned identical base member by having the projection on each received in the opening of the other, and with the clamping surfaces in spaced-apart opposed relationship to define a part receiving aperture.

In one arrangement, the opening in the base member includes opposite side surface portions facing generally toward one another, with one of such side surface portions defining a clamping and holding surface portion, and the other side surface portion defining a guide surface portion. The projection has an inner projection surface forming a continuation of the clamping and holding surface portion, and an exterior projection surface is located generally opposite from the inner projection surface. The projection has a width between its inner and exterior surfaces which is substantially less than the distance between the side surface portions of the opening. The projection and the opposite side surface portions of the opening are shaped and positioned so that reversely positioning a pair of the base members with the projection on each aligned with the opening in the other, and with the clamping and holding surfaces spaced-apart to define a part receiving aperture, results in decreasing the width of the part receiving aperture as the two base members are moved toward one another for reception of the projection on each in the opening of the other with the exterior projection surface on each member engaging the guide surface portion on the other member.

The part receiving aperture defined by the opposed clamping and holding surfaces on a pair of reversely positioned base members is preferably slightly smaller than the part to be received in such aperture so that the part is securely clamped, and the two base members are firmly held together by action of the clamping and holding surfaces firmly engaging the part.

In accordance with one arrangement, the base member includes a top portion, a bottom portion and generally flat opposite faces. The opening is formed in the base member between the opposite faces and is also open outwardly at the bottom portion to define a bottom opening. When a busbar or the like is clamped in the part receiving aperture, only the upper portion of the busbar is clamped, while the lower portion thereof extends downwardly through the bottom opening. The top portion of the base member is preferably formed with integral suspension means for suspending the base member from a support.

In one arrangement, the opening through the base member has a longitudinal axis, and the projection extends outwardly from one of the opposite side faces. The clamping and holding surface is inclined outwardly from the opening axis in a direction from the other face toward the one face.

The clamping and holding surface on the base member may be in the form of an inwardly arcuate groove extending along one side of the opening and the inner surface of the projection. The distance between the bottom of the groove and the other side of the opening is greater than the width of the bottom opening in the base member. This arrangement insures clamping and holding of a busbar or other part in the part receiving aperture while having a lower portion of the busbar or other part extending through the bottom opening below the clamping holder.

It is a principal object of the present invention to provide an improved clamping holder.

It is a further object of the invention to provide a clamping holder formed from two substantially identical parts which are reversibly positioned for cooperation with one another to clamp and hold a part.

It is a further object of the invention to provide an improved insulating holder and clamp for electrical busbars.

It is an additional object of the invention to provide an improved clamping holder for busbars or other parts which securely clamps a part against longitudinal movement relative to the clamping holder, and against lateral displacement from the clamping holder.

DESCRIPTION OF PREFERRED EMBODIMENTS

Figure 1:
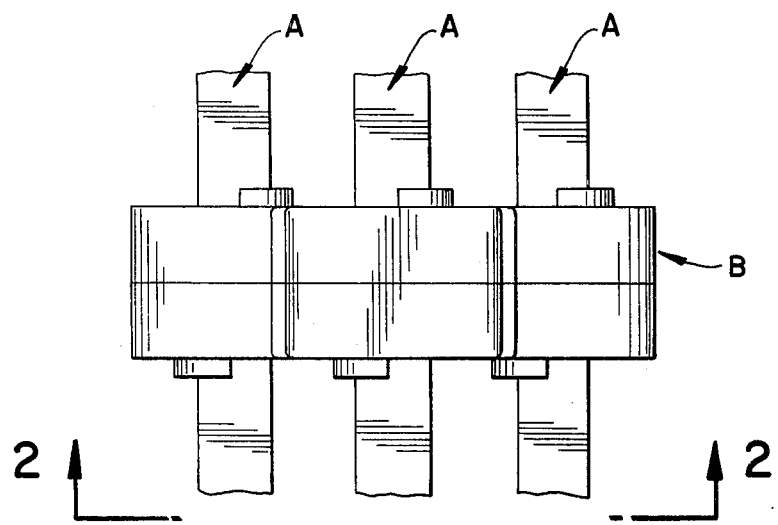
FIG. 1 is a plan view showing a plurality of busbars secured to a clamping holder.
Figure 2:
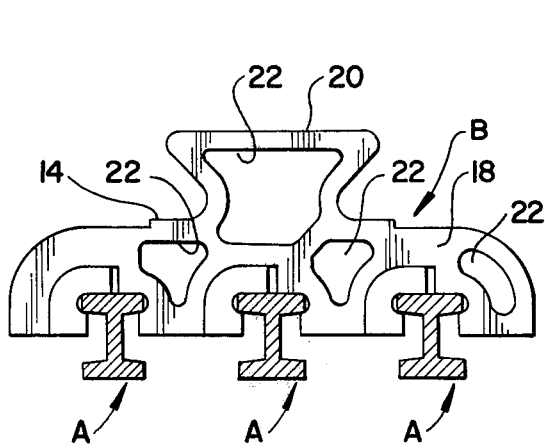
FIG. 2 is an elevational view taken generally on line 2—2 of FIG. 1.
Figure 3:
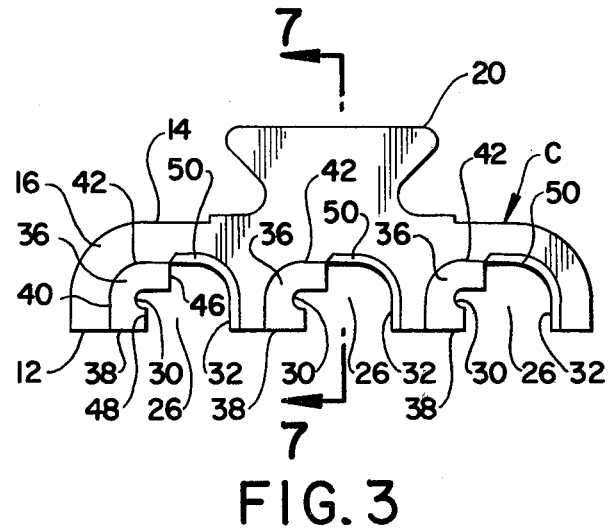
FIG. 3 is an elevational view of a base member used to form the clamping holder of the present application.
Figure 4:
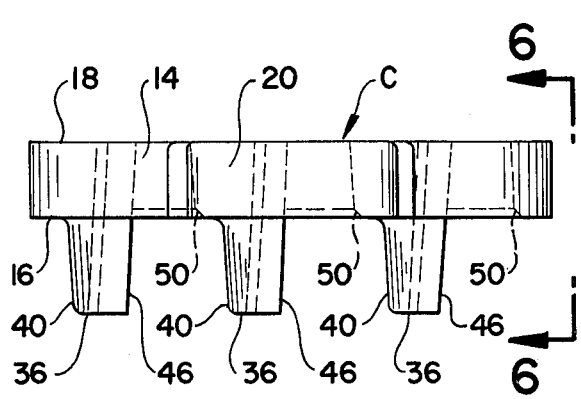
FIG. 4 is a top plan view of the base member of FIG. 3.

With reference to the drawing, FIGS. 1 and 2 show a plurality of elongated electrical busbars A clamped and held in spaced-apart relationship by a clamping holder B constructed in accordance with the present invention. In the arrangement shown, busbars A have a generally I-shaped cross-sectional configuration, although it will be appreciated that the improved clamping holder of the present invention can be used for clamping busbars or other parts having different shapes.

Clamping holder B is formed from a pair of generally identical base members, one of which is shown at C in FIGS. 3–7. Base member C has a generally flat bottom portion 12, an opposite top portion 14, and opposite generally flat faces 16 and 18. Integral suspension means in the form of an inverted generally equilateral trapezoid 20 is formed integral with base member C on top portion 14 thereof for suspending base member C from a support. Base member C is preferably molded in one piece of synthetic plastic material, although it will be appreciated that other materials could be used where electrical insulating properties were not necessary. As best shown in FIG. 2, one flat face 18 of base member C has a plurality of recesses or cavities formed therein and identified generally by numeral 22. Cavities 22 extend toward opposite face 16 and simply reduce the amount of material used in base member C.

Base member C has a plurality of spaced-apart openings 26 therein between opposite faces 16 and 18, and opening outwardly of bottom portion 12 at bottom openings. In the arrangement shown, there are three openings 26, with the center opening being centrally located, and the side openings being equidistantly spaced from the central opening. However, it will be appreciated that the clamping holder of the present application may be made with only one opening or with more than three. Each opening 26 has opposite side surface portions 30 and 32 facing one another in opposed spaced-apart relationship, with one side surface portion 30 defining a clamping and holding surface portion, and the other side surface portion 32 defining a guide surface portion.

An elongated projection 36 extends outwardly from face 16 of base member C adjacent each opening 26. Each projection 36 has an inner projection surface forming a continuation of clamping and holding surface 30 defined by a groove. Each projection 36 has a flat bottom surface 38 lying in the same plane as bottom portion 12; a side exterior projection surface 40 opposite from groove 30; and an upper exterior projection surface 42 opposite from bottom surface 38. Each projection 36 terminates at an upper longitudinal edge 46 and a bottom terminal edge 48 spaced toward the bottom of groove 30 from upper edge 46.

Each opening 26 is generally divided into two portions generally on opposite sides of upper projection edge 46. One portion of the opening has clamping and holding surface 30, while the other portion has guide surface portion 32 which has generally the same cross-sectional size and shape as the cross-sectional exterior size and shape of a projection 36. Actually, upper edge 46 of each projection does not extend to the midpoint of each opening 26 so that guide surface portion 32 is somewhat wider than the width of a projection 36. A slight chamfer 50 is formed in base member C between face 16 thereof and guide surface portion 32.

Figure 5:
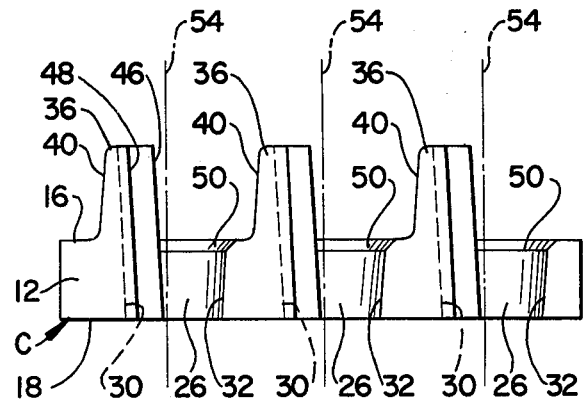
FIG. 5 is a bottom view of the base member of FIG. 3.
Figure 6:
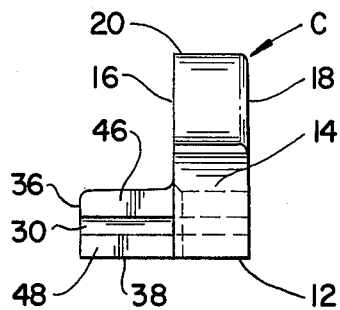
FIG. 6 is an end elevational view taken generally on line 6—6 of FIG. 4.
Figure 7:
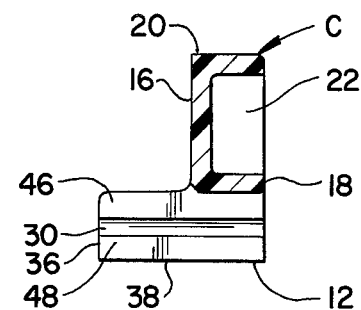
FIG. 7 is a cross-sectional elevational view taken generally on line 7—7 of FIG. 3.

As best shown in FIG. 5, each opening 26 has a longitudinal axis 54. Upper and lower projection edges 46 and 48, and the bottom of groove 30, all extend substantially parallel to one another and are inclined away from longitudinal axis 54 in a direction from face 18 toward face 16 of base member C. This outward inclination is only around 1° and is exaggerated in the drawing for clarity of illustration. Each side portion of a guide surface 32 is also inclined outwardly away from longitudinal axis 54 in a direction from face 18 toward 16 at an angle of around 1° and this inclination is also exaggerated for clarity of illustration. Each side exterior projection surface 40 is inclined toward axis 54 in a direction from face 16 toward the outer terminal end of the projection at an angle of around 1° which is exaggerated in the drawing for clarity.

Each projection 36 has a length from face 16 to its terminal end which is slightly greater than the thickness of base member C between its opposite faces 16 and 18. The distance between the bottom of inwardly extending arcuate groove 30 and opposite opening side 32 is greater than the width of the bottom opening across which each opening 26 opens outwardly of base member bottom portion 12. In addition, the distance across the bottom of groove 30 to opposite side 32 is greater than the width across a part receiving aperture defined by two facing grooves 30 by an amount slightly greater than the thickness of each projection 36 from the bottom of groove 30 to side exterior projection surface 40.

Figure 8:
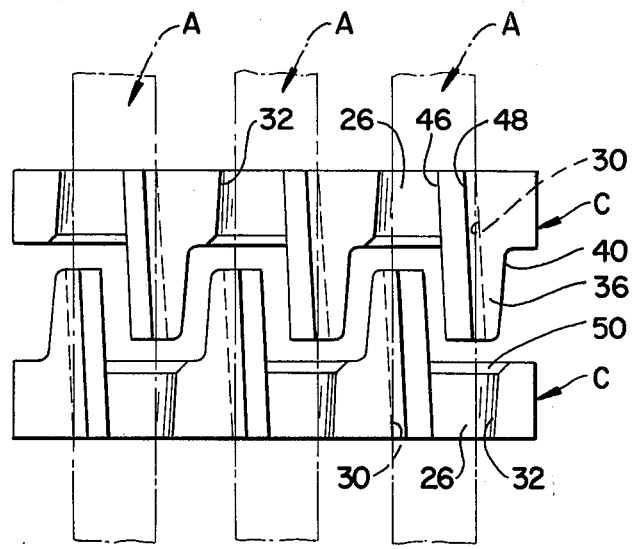
FIG. 8 is a bottom view showing a pair of reversely positioned base members ready for movement toward one another to clamp and hold a plurality of busbars.

A pair of base members are reversely positionable as shown in FIG. 8 with projection 36 on each aligned with an opening 26 in the other. Grooves 30 on the pair of members define part receiving aperture for receiving the upper portion of busbars A. As the pair of base members C are moved toward one another from the position shown in FIG. 8, the inclination of grooves 30, along with the cooperating inclination between opening side portions 32 and exterior projection surfaces 40, causes the width of the part receiving aperture across grooves 30 to decrease so that parts A are securely clamped with a tight fit. When parts A are securely clamped with base member C fully moved toward one another and faces 16 thereof in substantial engagement, the opposite upper portions of each busbar A are securely clamped between clamping and holding surfaces 30, and side exterior projection surfaces 40 are firmly engaged with opening guide surface portions 32. The lower portions of busbars A extend downwardly below bottom portions 12 of the assembled base members so that brushes on a trolley make continuous contact when passing a clamping and holding member B of FIG. 1.

Figure 9:
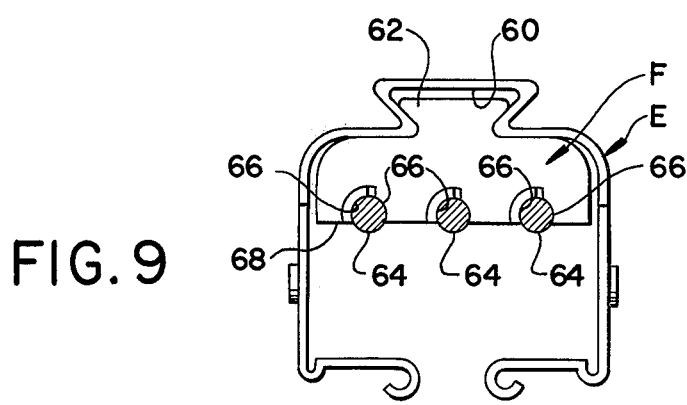
FIG. 9 is a cross-sectional elevational view showing another slightly modified form of clamping holder positioned in a housing of an electrical distribution system.

FIG. 9 shows a hollow metal housing E having a top recess generally in the form of an inverted equilateral trapezoid 60 for receiving suspension projection 62 on clamping holder F which is generally the same as suspension projection 20 on base member C. In the arrangement of FIGS. 1–8, the openings and clamping surfaces are shaped for clamping on the upper portions of generally I-shaped busbars. In the arrangement of FIG. 9, clamping holder F is also made in two parts in the same manner as described with respect to FIGS. 1–8. However, the openings, projections and clamping surfaces are all shaped to hold conductors 64 having a circular cross-sectional configuration. In such an arrangement, the opposed clamping surfaces 66, which correspond to surfaces 30 of base member C, are shaped to fit around slightly more than 180° of the upper portion of each conductor 64 to prevent displacement of such conductors from clamping and holding member F. This allows the lower portion of each conductor to project below the bottom portion 68 of clamping and holding member F. Obviously, conductors of many different shapes could be secured in part receiving apertures with the clamping holder of the present invention.

Chamfers 50 between face 16 and guide surface 32 facilitate entry of the projections on one base member into the openings on the other. Once a pair of base members are cooperatingly positioned in clamping and holding relationship with parts, the engagement of clamping surfaces 30 with the parts, and the engagement between projection exterior surfaces 40 and guide surfaces 32, securely holds the two base members together against separation, and also securely holds the parts against longitudinal movement or other displacement from the clamping holder. This is because the part receiving aperture defined between opposed surfaces 30 when two base members are moved fully toward one another has a width slightly less than the width of the part to be held and clamped. Base members C may be of rigid yet deformable material so that projections 36 will bend outwardly for firmly engaging exterior projection surfaces 40 with guide surface portions 32 when a part is securely held and clamped in a part receiving aperture.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A clamping holder for clamping and holding a part comprising; a base member including a top portion, a bottom portion and opposite faces, an opening in said base member extending between and opening outwardly of said opposite faces and also opening outwardly at said bottom portion, said opening including opposite side surface portions facing generally toward one another, one of said side surface portions defining a clamping and holding surface portion and the other of said side surface portions defining a guide surface portion, a projection extending outwardly from said base member and having an inner projection surface forming a continuation of said clamping and holding surface portion, said projection having an exterior projection surface generally opposite from said inner projection surface and having a width between said inner and exterior surfaces thereof which is substantially less than the distance between said side surface portions of said opening, said projection and said opposite side surface portions of said opening being formed so that reversely positioning a pair of the base members with the projection on each aligned with the opening in the other and with the clamping and holding surfaces spaced apart to define a part receiving aperture results in decreasing the width of the part receiving aperture as the two members are moved toward one another and the projection on each is received in the opening of the other with the exterior projection surface on each member engaging the guide surface portion of the other.

2. A clamping holder for clamping and holding a part comprising; a base member including a top portion, a bottom portion and opposite faces, suspension means on said top portion for suspending said base member from a support, said base member having an opening therethrough, said opening including opposite side surface portions facing generally toward one another, one of said side surface portions defining a clamping and holding surface portion and the other of said side surface portions defining a guide surface portion, a projection extending outwardly from said base member and having an inner projection surface forming a continuation of said clamping and holding surface portion, said projection having an exterior projection surface generally opposite from said inner projection surface and having a width between said inner and exterior surfaces thereof which is substantially less than the distance between said side surface portions of said opening, said projection and said opposite side surface portions of said opening being formed so that reversely positioning a pair of the base members with the projection on each aligned with the opening in the other and with the clamping and holding surfaces spaced apart to define a part receiving aperture results in decreasing the width of the part receiving aperture as the two members are moved toward one another and the projection on each is received in the opening of the other with the exterior projection surface on each member engaging the guide surface portion of the other.

3. A clamping holder for clamping and holding a part comprising; a base member including a top portion, a bottom portion and opposite faces, an opening through said base member, said opening having a longitudinal axis extending between said faces and being outwardly open at said bottom portion, said opening including opposite side surface portions facing generally toward one another, one of said side surface portions defining a clamping and holding surface portion and the other of said side surface portions defining a guide surface portion, a projection on said base member extending outwardly from one of said faces and having an inner projection surface forming a continuation of said clamping and holding surface portion, said clamping and holding surface portion being inclined outwardly from said longitudinal axis of said opening in a direction from the other of said faces toward said one face, said projection having an exterior projection surface generally opposite from said inner projection surface and having a width between said inner and exterior surfaces thereof which is substantially less then the distance between said side surface portions of said opening, said projection and said opposite side surface portions of said opening being formed so that reversely positioning a pair of the base members with the projection on each aligned with the opening in the other and with the clamping and holding surfaces spaced apart to define a part receiving aperture results in decreasing the width of the part receiving aperture as the two members are moved toward one another and the projection on each is received in the opening of the other with the exterior projection surface on each member engaging the guide surface portion of the other.

4. A clamping holder for clamping and holding a part comprising; a base member including a top portion, a bottom portion and opposite faces, an opening through said base member extending across said faces and being outwardly open at said bottom portion across a width which is substantially less than the width of said opening above said bottom portion, said opening including opposite side surface portions facing generally toward one another, one of said side surface portions defining a clamping and holding surface portion and the other of said side surface portions defining a guide surface portion, a projection extending outwardly from said base member and having an inner projection surface forming a continuation of said clamping and holding surface portion, said projection having an exterior projection surface generally opposite from said inner projection surface and having a width between said inner and exterior surfaces thereof which is substantially less than the distance between said side surface portions of said opening, said projection and said opposite side surface portions of said opening being formed so that reversely positioning a pair of the base members with the projection on each aligned with the opening in the other and with the clamping and holding surfaces spaced apart to define a part receiving aperture results in decreasing the width of the part receiving aperture as the two members are moved toward one another and the projection on each is received in the opening of the other with the exterior projection surface on each member engaging the guide surface portion of the other.

5. A clamping holder for clamping and holding a part comprising; a base member having a plurality of spaced apart openings therethrough, each said opening including opposite side surface portions facing generally toward one another, one of said side surface portions defining a clamping and holding surface portion and the other of said side surface portions defining a guide surface portion, a plurality of spced apart projections extending outwardly from said base member, one of said projections being positioned adjacent each said opening and each said projection having an inner projection surface forming a continuation of said clamping and holding surface portion, each said projection having an exterior projection surface generally opposite from said inner projection surface and having a width between said inner and exterior surfaces thereof which is substantially less than the distance between said side surface portions of each said opening, each said projection and said opposite side surface portions of each said opening being formed so that reversely positioning a pair of the base members with the projections on each aligned with the openings in the other and with the clamping and holding surfaces spaced apart to define part receiving apertures results in decreasing the width of the part receiving apertures as the two members are moved toward one another and the projections on each are received in the openings of the other with the exterior projection surfaces on each member engaging the guide surface portions of the other.

6. A clamping holder comprising; a base member having at least one projection, opening and clamping surfaces all positioned for cooperation with a reversely positioned identical base member by having the projection on each received in the opening of the other with the clamping surfaces in spaced-apart opposed relationship to define a part receiving aperture, said base member having a bottom portion and said opening being outwardly open of said bottom portion at a bottom opening, and said clamping surface comprising a longitudinally extending arcuate groove in said base member along one side of said opening spaced above said bottom opening.

7. The clamping holder of claim 6 wherein said groove extends along said projection and said opening includes a projection receiving portion spaced outwardly from said groove having generally the same cross-sectional size and shape as the exterior cross-sectional size and shape of said projection.

8. In combination, a clamping holder formed by a pair of identical base members, each said base member having at least one projection, opening and clamping surface all positioned in cooperative relationship with a reversely positioned identical base member by having the projection on each received in the opening of the other with the clamping surfaces in spaced apart opposed relationship to define a busbar receiving aperture, each said base member having a bottom portion and each said opening being outwardly open of said bottom portion, said clamping surface on each said base member being shaped for defining a part receiving aperture on the pair of reversely positioned base members which receives and clamps an upper portion of an elongated busbar with the lower portion of the busbar extending outwardly of the bottom portions of the members, and a busbar so received and clamped in said aperture.

* * * * *